(12) United States Patent
Danckert et al.

(10) Patent No.: US 9,086,003 B2
(45) Date of Patent: Jul. 21, 2015

(54) EXHAUST GAS CLEANING DEVICE FOR A WATERCRAFT, METHOD FOR OPERATING AN EXHAUST GAS CLEANING DEVICE AND WATERCRAFT

(71) Applicant: EMITEC GESELLSCHAFT FUER EMMISSIONSTECHNOLOGIE MBH, Lohmar (DE)

(72) Inventors: Bernd Danckert, Meckenbeuren (DE); Samuel Vogel, Bad Waldsee (DE); Sebastian Beyer, Meckenbeuren (DE)

(73) Assignee: EMITEC Gesellschaft fuer Emissionstechnolgie mbH, Lohmar (DE)

( * ) Notice: Subject to any disclaimer, the term of this patent is extended or adjusted under 35 U.S.C. 154(b) by 0 days.

(21) Appl. No.: 14/040,946

(22) Filed: Sep. 30, 2013

(65) Prior Publication Data
US 2014/0026543 A1    Jan. 30, 2014

Related U.S. Application Data

(63) Continuation of application No. PCT/EP2012/055799, filed on Mar. 30, 2012.

(30) Foreign Application Priority Data

Mar. 30, 2011    (DE) .......................... 10 2011 015 513

(51) Int. Cl.
*F01N 3/00*    (2006.01)
*F01N 3/02*    (2006.01)
(Continued)

(52) U.S. Cl.
CPC .............. *F01N 3/0205* (2013.01); *F01N 3/033* (2013.01); *F01N 3/2066* (2013.01); *F01N 2240/02* (2013.01); *F01N 2410/02* (2013.01); *F01N 2590/02* (2013.01); *Y02T 10/24* (2013.01)

(58) Field of Classification Search
USPC ................... 60/274, 286, 297, 298, 301, 320; 440/88 G, 88 J, 88 HE, 89 C, 89 R, 89 H
See application file for complete search history.

(56) References Cited

U.S. PATENT DOCUMENTS

| 5,885,122 A | 3/1999 | Fujimoto |
| 5,987,885 A | 11/1999 | Kizer et al. |

(Continued)

FOREIGN PATENT DOCUMENTS

| EP | 0442331 A1 | 8/1991 |
| EP | 1326011 A2 | 7/2003 |

(Continued)

OTHER PUBLICATIONS

International Search Report of PCT/EP2012/055799, Dated Aug. 14, 2012.

*Primary Examiner* — Binh Q Tran
(74) *Attorney, Agent, or Firm* — Laurence A. Greenberg; Werner H. Stemer; Ralph E. Locher

(57) ABSTRACT

An exhaust gas cleaning device for a watercraft includes at least a particle filter and/or an SCR catalytic converter and a heat exchanger disposed upstream thereof. The heat exchanger is operated with seawater as a cooling medium. The heat exchanger has an exhaust gas inlet side and an exhaust gas outlet side and is suitable for reducing a volumetric flow rate of an exhaust gas between the exhaust gas inlet side and the exhaust gas outlet side by a certain value in a certain temperature range of the exhaust gas at the exhaust gas inlet side. A watercraft and a method for operating an exhaust gas cleaning device for a watercraft are also provided.

8 Claims, 3 Drawing Sheets

(51) Int. Cl.
*F01N 3/033* (2006.01)
*F01N 3/20* (2006.01)

(56) References Cited

U.S. PATENT DOCUMENTS

| | | | |
|---|---|---|---|
| 6,422,007 B1 | 7/2002 | Hartick | |
| 6,804,949 B2 * | 10/2004 | Andrews et al. | 60/272 |
| 6,820,419 B2 * | 11/2004 | Ford et al. | 60/310 |
| 7,390,232 B1 * | 6/2008 | English et al. | 440/89 E |
| 7,503,819 B1 * | 3/2009 | Jaeger et al. | 440/88 C |
| 8,327,631 B2 * | 12/2012 | Caro et al. | 60/297 |
| 8,361,422 B2 * | 1/2013 | Soukhojak et al. | 423/212 |
| 8,602,117 B2 * | 12/2013 | Janik | 169/13 |

FOREIGN PATENT DOCUMENTS

| | | |
|---|---|---|
| JP | H07119445 A | 5/1995 |
| JP | 2002070528 A | 3/2002 |
| KR | 20030039472 A | 5/2003 |

* cited by examiner

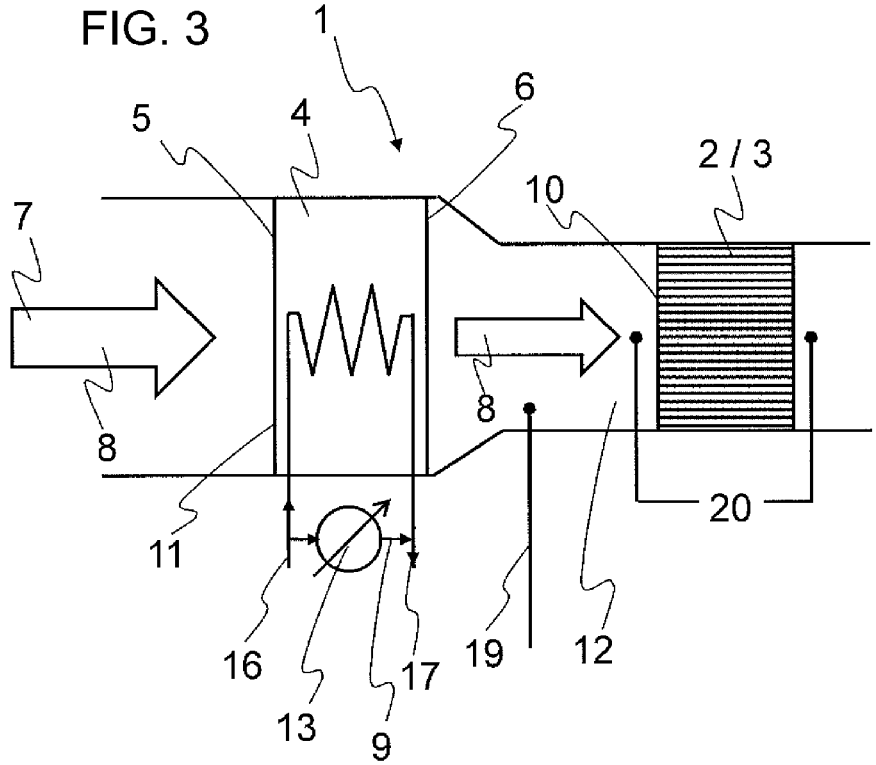
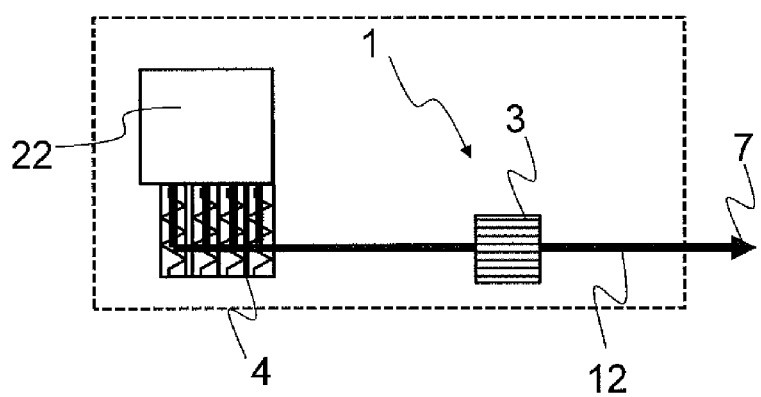

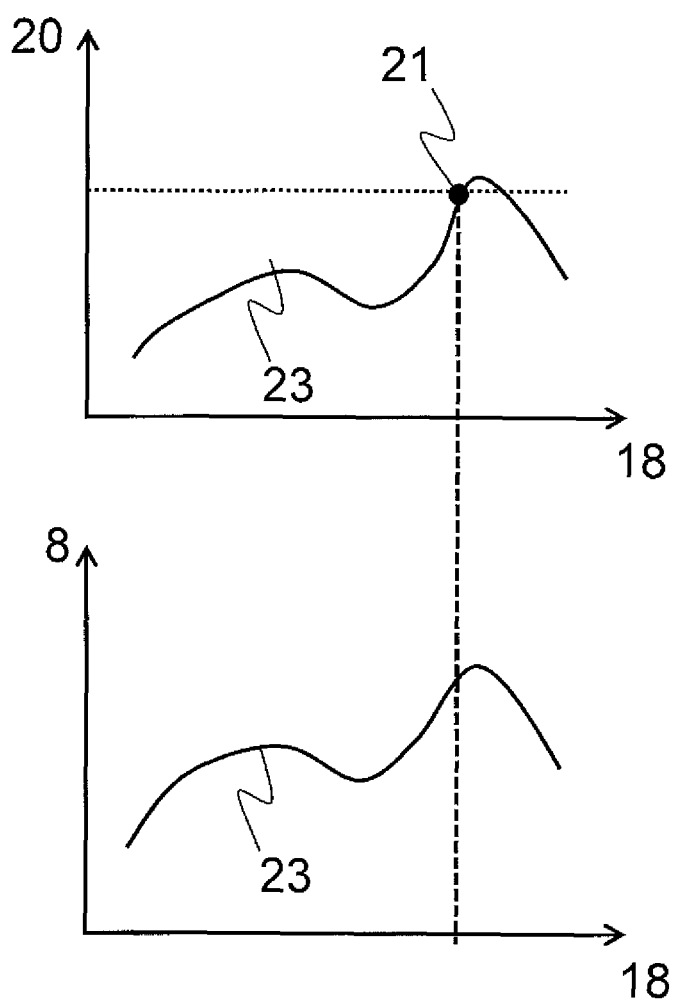

EXHAUST GAS CLEANING DEVICE FOR A WATERCRAFT, METHOD FOR OPERATING AN EXHAUST GAS CLEANING DEVICE AND WATERCRAFT

CROSS-REFERENCE TO RELATED APPLICATION

This is a continuation, under 35 U.S.C. §120, of copending International Application No. PCT/EP2012/055799, filed Mar. 30, 2012, which designated the United States; this application also claims the priority, under 35 U.S.C. §119, of German Patent Application DE 10 2011 015 513.9, filed Mar. 30, 2011; the prior applications are herewith incorporated by reference in their entirety.

BACKGROUND OF THE INVENTION

Field of the Invention

The invention relates to an exhaust gas cleaning device for a watercraft, to a method for operating an exhaust gas cleaning device and to a watercraft.

As a rule, watercraft have large-volume internal combustion engines and exhaust systems of corresponding construction. Due to ever stricter directives relating to permitted emissions from internal combustion engines or drive units on watercraft, complex exhaust gas cleaning devices are required in many cases, even for watercraft. Due to the high exhaust gas throughput (volume flow/mass flow), exhaust gas cleaning devices of correspondingly large volume also have to be provided, and those can be of correspondingly high cost. Appropriate exhaust gas cleaning devices, e.g. oxidation catalytic converters, storage elements, particulate filters, SCR systems (hydrolytic catalytic converters and SCR catalytic converters), on one hand have to be given a large volume and, on the other hand, have to be provided with a large amount of coating to enable pollutants in the exhaust gas to be converted in an appropriate manner. In that case, the overall size of those exhaust gas treatment devices that are now necessary must also be considered critically because they take up a considerable amount of installation space in the watercraft and therefore have to be given appropriate consideration, even at the planning stage, or have to be integrated later, which is only possible with difficulty. At the same time, that additional requirement for installation space gives rise to a considerable expense, and that likewise has to be taken into consideration in the production of a watercraft.

BRIEF SUMMARY OF THE INVENTION

It is accordingly an object of the invention to provide an exhaust gas cleaning device for a watercraft, a method for operating an exhaust gas cleaning device and a watercraft, which overcome the hereinafore-mentioned disadvantages and at least partially solve the highlighted technical problems of the heretofore-known devices, methods and watercraft of this general type. In particular, the intention is to specify an exhaust gas cleaning device which, on one hand, allows a compact construction and, on the other hand, allows efficient exhaust gas emission control or cleaning. Moreover, it should be suitable for production at low cost and for retrofitting.

With the foregoing and other objects in view there is provided, in accordance with the invention, an exhaust gas cleaning device for a watercraft, comprising at least a particulate filter or an SCR catalytic converter and a heat exchanger which is disposed upstream thereof, has an exhaust gas inlet side and an exhaust gas outlet side and is operated with seawater as a cooling medium. The heat exchanger is suitable for reducing a volume flow of an exhaust gas between the exhaust gas inlet side and the exhaust gas outlet side by at least 30% in a temperature range of the exhaust gas at the exhaust gas inlet side of 300 to 550° C., in particular of 400 to 550° C.

The exhaust gas cleaning device is suitable, in particular, for a maximum exhaust gas mass flow of at least 1,500 kg/h.

In particular, the exhaust pipe has an inside diameter of 75 mm to 400 mm, in particular 75 mm to 200 mm, upstream of the heat exchanger. In particular, the heat exchanger has a cooling capacity of 50 kW to 1,000 kW, in particular up to about 750 kW. It preferably has a volume of 0.05 $m^3$ to 1.0 $m^3$ (installation space), particularly preferably of 0.05 $m^3$ to 0.5 $m^3$. The heat exchanger is preferably embodied as a tubular heat exchanger or a plate heat exchanger.

Due to the configuration of the heat exchanger upstream of a particulate filter and/or of an SCR catalytic converter, a reduction in the volume flow of the exhaust gas is achieved through the cooling of the exhaust gas. Accordingly, the downstream particulate filter and/or the downstream SCR catalytic converter can be constructed for a lower volume flow. It is thus possible in this case to employ small-volume particulate filters and/or SCR catalytic converters which, in particular, require a correspondingly smaller quantity of coating material. As a result, the production costs for the particulate filters and SCR catalytic converters are lower and a smaller installation space is required for placement of those components in the watercraft.

Another significant advantage of this invention is that the pressure drop across the particulate filter and/or the SCR catalytic converter can be adjusted or reduced in this way (if appropriate according to requirements). As the exhaust gas flows through the particulate filter and/or the SCR catalytic converter, a backpressure is built up in the direction of the internal combustion engine, which can impair the combustion processes there and hence can also lead to power losses. Cooling and hence reduction of the pressure drop avoid those effects.

According to a particularly advantageous development of the exhaust gas cleaning device, the heat exchanger reduces the temperature of the exhaust gas between the exhaust gas inlet side and the exhaust gas outlet side of the heat exchanger to a maximum of 200° C., preferably to a maximum of 150° C., and particularly preferably to a maximum of 100° C., at the exhaust gas outlet side of the heat exchanger, starting from an exhaust gas temperature at the inlet of the heat exchanger of from 400 to 550° C. In particular, therefore, the heat exchanger is constructed in such a way that there can be a reduction in the exhaust gas temperature by as much as 200° C. to about 350° C. A volume flow reduction with respect to the exhaust gas of more than 45%, preferably more than 60%, can thus be achieved. The backpressure or differential pressure between the exhaust gas inlet side and the exhaust gas outlet side of the particulate filter and/or of the SCR catalytic converter can accordingly be reduced by about 40 to 90%.

In accordance with another advantageous feature of the exhaust gas cleaning device of the invention, the heat exchanger can be regulated and/or includes a bypass. Regulation of the heat exchanger is accomplished, in particular, by using an electronically and/or hydraulically controlled valve, thus allowing the volume flow of the seawater through the heat exchanger to be adjusted accordingly. In addition or as an alternative, a bypass (bypassing of the cooling section of the heat exchanger) can be provided, and therefore only the volume flow through the heat exchanger or through the bypass is adapted in an appropriate manner but a uniform quantity of seawater can be delivered continuously to the heat exchanger circuit.

In particular, regulation of the heat exchanger ensures that a temperature required for a catalytic reaction or some other reaction in the particulate filter and/or in the SCR catalytic converter is not undershot. In particular, it is furthermore possible to determine the times of regeneration of the particulate filter and/or of the SCR catalytic converter by appropriately reducing the cooling capacity of the heat exchanger. In this case, it is possible as a preferred option for a maximum temperature not to be overshot, thus enabling appropriate high-efficiency coatings to be employed for the particulate filter and/or the SCR catalytic converter. A vanadium-oxide coating, which can be used at exhaust gas temperatures of up to 450° C., is preferably employed in this case. In particular, this has a high efficiency as a coating in the SCR catalytic converter, thus ensuring that a reduction in the volume flow and a corresponding reduction in the available surface area in the SCR catalytic converter through the reduction in the size of the SCR catalytic converter continues to allow adequate conversion of the pollutants in the SCR catalytic converter.

In accordance with a further advantageous feature of the exhaust gas cleaning device of the invention, at least the particulate filter or the SCR catalytic converter has a maximum first throughflow cross section for the exhaust gas which is at least 30% less than a second throughflow cross section for the exhaust gas on the exhaust gas inlet side of the heat exchanger.

For the first time, the present invention proposes the selective and regulated reduction of a volume flow upstream of the particulate filter and/or of the SCR catalytic converter, thus making it possible to significantly reduce the cross-sectional areas for throughflow of exhaust gas cleaning devices disposed downstream of a heat exchanger. This significant reduction in the cross-sectional area for throughflow also reduces the required installation space and significantly lowers the production costs of these exhaust gas cleaning devices. The expensive coating of an SCR catalytic converter, in particular, can thus be provided in a significantly more advantageous manner, allowing highly efficient purification of the exhaust gas from watercraft while simultaneously lowering investment costs. In particular, the heat exchanger itself can have a smaller cross-sectional area for throughflow on the exhaust gas outlet side than on the exhaust gas inlet side since the volume flow is preferably lowered continuously in the heat exchanger.

With the objects of the invention in view, there is also provided a method for operating an exhaust gas cleaning device for a watercraft, wherein the exhaust gas cleaning device includes at least one exhaust line having at least a particulate filter or an SCR catalytic converter and a heat exchanger disposed upstream thereof. The heat exchanger is operated with seawater as a cooling medium. The method comprises at least the following steps:
  a) determining at least an exhaust gas temperature and/or an exhaust gas pressure difference of the particulate filter and/or the SCR catalytic converter, and
  b) if the exhaust gas temperature and/or the exhaust gas pressure difference is greater than a limiting value, then
  c) reducing a volume flow by lowering the exhaust gas temperature using the heat exchanger.

It is explicitly noted that the statements made with reference to the exhaust gas cleaning device can equally be applied to the method according to the invention and vice versa. It is immaterial in this case whether there are further exhaust gas cleaning devices in addition to one or more particulate filters and/or SCR catalytic converters.

The exhaust gas temperature can be determined by calculation and/or by using suitable sensors at one or more points on the exhaust line. The exhaust gas temperature is preferably determined upstream of the heat exchanger. However, further positions or alternative positions, e.g. between the heat exchanger and the particulate filter and/or SCR catalytic converter, are also possible. The exhaust gas pressure difference of the particulate filter and/or of the SCR catalytic converter is likewise determined by calculation and/or by using sensors in the exhaust line itself. The exhaust gas pressure difference is obtained by calculation from the difference between the respective exhaust gas pressure on the exhaust gas inlet side and on the exhaust gas outlet side of the particulate filter and/or of the SCR catalytic converter. In particular, this is accomplished by measuring the pressure ahead of the inlet to the SCR catalytic converter or to the particulate filter because it may also be possible to determine the pressure downstream of the particulate filter or of the SCR catalytic converter by calculation.

The limiting value specified indicates a maximum exhaust gas temperature, for example denoting possible damage to the exhaust gas cleaning device and/or an unwanted effect on the effectiveness/efficiency of the exhaust system and/or of the internal combustion engine. In particular, the limiting value indicates an exhaust gas pressure difference which characterizes the maximum possible volume flow for which the particulate filter or SCR catalytic converter is constructed. The volume flow in the exhaust line is accordingly reduced by lowering the exhaust gas temperature by using the heat exchanger, thus lowering the exhaust gas temperature and/or the exhaust gas pressure difference to below the limiting value indicated.

In accordance with another mode of the method of the invention, the cooling medium of the heat exchanger is passed through a bypass of the heat exchanger if step b) is not satisfied, ensuring that the exhaust gas temperature and the volume flow are not reduced further. In particular, this prevents an impermissible reduction in the exhaust gas temperature, thus continuing to ensure conversion of pollutants in the exhaust gas cleaning devices—which would not otherwise occur—since the required minimum reaction temperature is maintained.

With the objects of the invention in view, there is concomitantly provided a watercraft, comprising at least an exhaust gas cleaning system according to the invention and a controller configured or suitable to carry out the method according to the invention.

As a very particularly preferred option, the heat exchanger is a part of the exhaust line which is positioned close to the drive. Such a part of the exhaust line is also referred to as a manifold, for example. As a very particularly preferred option, this part of the exhaust line is cooled, with the heat exchanger thus being formed in this way. In particular, therefore, there is a flow of a cooling medium around this part of the exhaust line, this being achieved, for example, by forming a cooling jacket around the exhaust line.

Even if the subject matter of the present application is described primarily with reference to a watercraft, the invention can also be applied (independently) to other vehicles. Automobiles (cars, trucks) may likewise be mentioned herein by way of example.

Accordingly, a proposal is also for an exhaust gas cleaning device for a vehicle, at least comprising a particulate filter or an SCR catalytic converter and a heat exchanger which is disposed upstream thereof and is operated with a cooling medium, wherein the heat exchanger has an exhaust gas inlet side and an exhaust gas outlet side and is suitable for reducing a volume flow of an exhaust gas between the exhaust gas inlet side and the exhaust gas outlet side by at least 30% in a temperature range of the exhaust gas of 300 to 550° C. at the exhaust gas inlet side.

Thus, the following method may also be advantageous over the prior art: a method for operating an exhaust gas cleaning device for a vehicle, wherein the exhaust gas cleaning device includes at least one exhaust line having at least one particulate filter or one SCR catalytic converter and a heat exchanger disposed upstream thereof, wherein the heat exchanger is operated with a cooling medium, and the method comprises at least the following steps:

a) determining at least one exhaust gas temperature and/or one exhaust gas pressure difference of the particulate filter and/or the SCR catalytic converter, and b) if the exhaust gas temperature and/or the exhaust gas pressure difference is greater than a limiting value, then c) reducing a volume flow (8) by lowering the exhaust gas temperature using the heat exchanger.

In the case of use on a vehicle, it is possible, for example, to use a separate cooling medium circuit and/or for the cooling medium circuit of the drive to be used as well. Water, in particular, may therefore be considered as a cooling medium.

With respect to the preferred embodiments of the invention, as are described herein with regard to the technical variants in the case of the heat exchanger and/or the exhaust gas cleaning system (in particular also in the claims worded as dependent claims), they can readily be combined with the above configurations and methods on motor vehicles, unless this is explicitly excluded or a person skilled in the art can easily see that this is not possible.

Other features which are considered as characteristic for the invention are set forth in the appended claims, noting that the features presented individually in the dependent claims can be combined in any technologically meaningful way and give rise to further embodiments of the invention. The description, especially in conjunction with the figures, explains the invention further and gives supplementary illustrative embodiments of the invention.

Although the invention is illustrated and described herein as embodied in an exhaust gas cleaning device for a watercraft, a method for operating an exhaust gas cleaning device and a watercraft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a longitudinal-sectional view of an exhaust gas cleaning device in accordance with a second embodiment;

FIG. 4 includes two diagrams illustrating the method; and

FIG. 5 is a schematic and block diagram of an exhaust gas cleaning device in accordance with a third embodiment.

DESCRIPTION OF THE INVENTION

Figure 1:
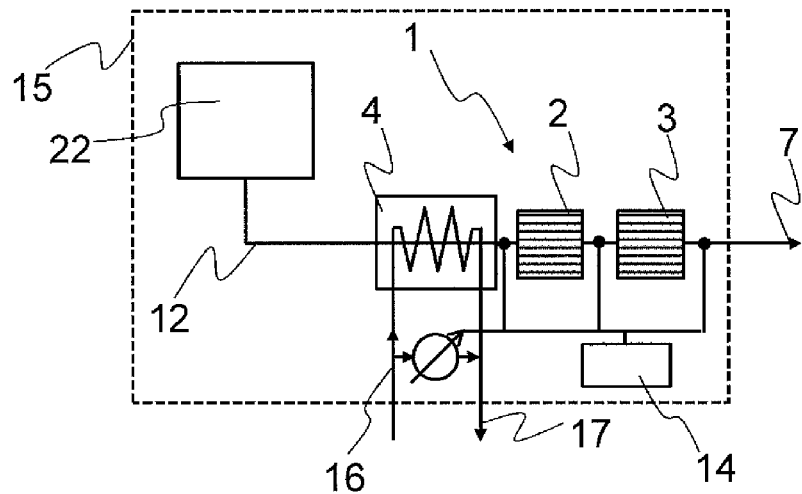
FIG. 1 is a schematic and block diagram of a watercraft having an exhaust gas cleaning device.

Referring now in detail to the figures of the drawings, which show especially preferred illustrative embodiments to which the invention is not restricted, and first, particularly, to FIG. 1 thereof, there is seen a schematic and block diagram of a watercraft 15 having a drive 22 and an exhaust line 12 connected to the drive 22. The exhaust line 12 carries exhaust gas 7 toward an exhaust gas cleaning or emission control device 1, which has a heat exchanger 4, a particulate filter 2 and an SCR catalytic converter 3, downstream of the heat exchanger. The heat exchanger 4 includes a cooling circuit 17 which is operated with seawater 16 as a cooling medium. The use of a seawater heat exchanger is advantageous, in particular, because the heat exchanger can be embodied as an "open" circuit, wherein fresh (cool) seawater is continuously fed in and heated seawater can be discharged back into the seawater (through the exhaust line). Moreover, it is also possible for this seawater to be used to cool further components of the watercraft, e.g. the internal combustion engine. The exhaust gas cleaning device 1 furthermore includes a controller 14, which is connected to corresponding sensors in the exhaust line and the heat exchanger 4.

Figure 2:
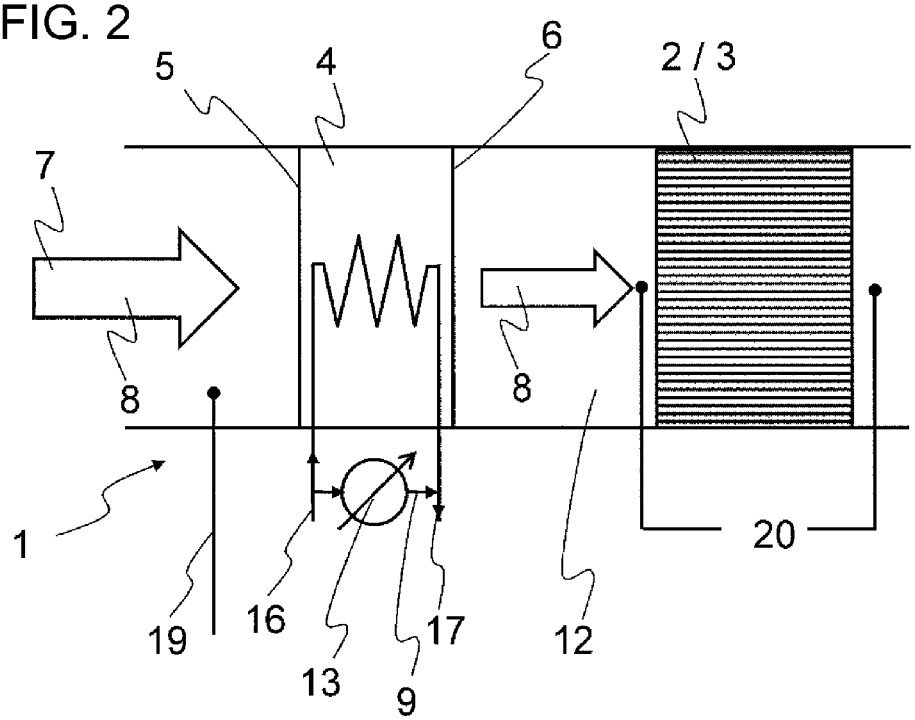
FIG. 2 is a diagrammatic, longitudinal-sectional view of an exhaust gas cleaning device in accordance with a first embodiment.

FIG. 2 shows a first embodiment of an exhaust gas cleaning device 1. This device 1 includes an exhaust line 12, in which a heat exchanger 4 with an exhaust gas inlet side 5 and an exhaust gas outlet side 6 is disposed. An SCR catalytic converter 3 or a particulate filter 2 is disposed downstream of the heat exchanger 4. An exhaust gas 7 flows through the exhaust line 12 in the direction of the heat exchanger 4. The exhaust gas 7 has a volume flow 8 upstream of the heat exchanger 4 and an exhaust gas temperature, which in this case is detected by using a (schematically indicated) sensor 19 projecting into the exhaust line 12. The heat exchanger 4 includes a regulator 13 for regulating the cooling capacity of the heat exchanger 4, which is operated with seawater 16 as a cooling medium in a cooling circuit 17 and which additionally has a bypass 9. Due to the flow through the heat exchanger 4, the volume flow 8 of the exhaust gas 7 is reduced. For this reason, the volume flow 8 through the SCR catalytic converter 3 or particulate filter 2 disposed downstream of the heat exchanger 4 is less than the volume flow 8 entering through the exhaust gas inlet side 5 of the heat exchanger 4. An exhaust gas pressure difference 20 is determined at the SCR catalytic converter 3 or particulate filter 2.

FIG. 3 shows a second embodiment of the exhaust gas cleaning device 1 and, in this case too, an exhaust line 12 is shown, in which a heat exchanger 4 and a particulate filter 2 and/or SCR catalytic converter 3 are disposed, downstream of the heat exchanger 4. The exhaust line 12 has a reduction downstream of the heat exchanger 4, as a result of which the exhaust line 12 has a reduced cross-sectional area for throughflow downstream of the heat exchanger 4. Accordingly, a first cross section 10 of the particulate filter 2 or of the SCR catalytic converter 3 is smaller than a second cross section 11 of the exhaust gas inlet side 5 of the heat exchanger 4. As already discussed above, the heat exchanger 4 includes a regulator 13 for regulating a cooling capacity. Seawater 16 is used as a cooling medium in a cooling circuit 17 in this case. The regulator 13 furthermore includes a bypass 9, thus allowing the cooling of the exhaust gas 7 to be adjusted accordingly. The volume flow 8 of the exhaust gas 7 through the heat exchanger 4 is reduced by the corresponding regulator 13, as a result of which only a reduced volume flow 8 impinges on the downstream particulate filter 2 or SCR catalytic converter 3 downstream of the heat exchanger 4. In this case, a sensor 19 for measuring the exhaust gas temperature is disposed between the heat exchanger 4 and the SCR catalytic converter 3 or particulate filter 2. The exhaust gas pressure difference 20 is determined across the particulate filter 2 or SCR catalytic converter 3.

FIG. 4 diagrammatically illustrates the method. In an upper diagram, the exhaust gas pressure difference 20 is plotted on the vertical axis and the time 18 is plotted on the horizontal axis. The diagram shows a profile 23 of the exhaust gas pressure difference 20 across the SCR catalytic converter 3 or particulate filter 2 (step a) of the method). If this profile 23 of the exhaust gas pressure difference 20 overshoots a limiting value 21 (step b) of the method), the cooling capacity of the heat exchanger is increased accordingly (step c) of the method). In the lower diagram, the volume flow 8 is plotted in a corresponding manner on the vertical axis against the time 18, which is plotted on the horizontal axis. The lower diagram illustrates a profile 23 of the volume flow 8. In this case, the volume flow 8 downstream of the heat exchanger 4 is indicated. Due to the increase in the cooling capacity of the heat exchanger 4, the volume flow 8 is reduced accordingly when the limiting value 21 is overshot by the exhaust gas pressure difference 20, as a result of which the exhaust gas pressure difference 20 also falls in a corresponding manner.

FIG. 5 shows an exhaust gas cleaning device 1 at a drive 22, e.g. of a vehicle, in which the heat exchanger 4 is disposed on a part of the exhaust line 12 (the so-called "manifold") close to the drive 22. In this case, the heat exchanger 4 forms a kind of cooling jacket around the exhaust line.

The invention claimed is:

1. An exhaust gas cleaning device for a watercraft, the exhaust gas cleaning device comprising:
 a particulate filter or an SCR catalytic converter, said particulate filter or SCR catalytic converter having a maximum first throughflow cross section for the exhaust gas; and
 a heat exchanger disposed upstream of said particulate filter or SCR catalytic converter in an exhaust gas flow direction;
 said heat exchanger configured to operate with seawater as a cooling medium;
 said heat exchanger having an exhaust gas inlet side and an exhaust gas outlet side, said exhaust gas inlet side of said heat exchanger having a second throughflow cross section for the exhaust gas;
 said heat exchanger configured to reduce a volume flow of exhaust gas between said exhaust gas inlet side and said exhaust gas outlet side by at least 30% in a temperature range of the exhaust gas of 300 to 550° C. at said exhaust gas inlet side, said reduction in volume flow being achieved by cooling the exhaust gas; and
 said first throughflow cross section being at least 30% less than said second throughflow cross section.

2. The exhaust gas cleaning device according to claim 1, wherein said heat exchanger has at least one of a regulator or a bypass.

3. A method for operating an exhaust gas cleaning device for a watercraft, the method comprising the following steps:
 providing the exhaust gas cleaning device with an exhaust line having at least one particulate filter or SCR catalytic converter and a heat exchanger upstream of the particulate filter or SCR catalytic converter in an exhaust gas flow direction, the heat exchanger having an exhaust gas inlet side and an exhaust gas outlet side;
 providing the particulate filter or SCR catalytic converter with a maximum first throughflow cross section for the exhaust gas;
 providing the exhaust gas inlet side of the heat exchanger with a second throughflow cross section for the exhaust gas;
 dimensioning the first throughflow cross section to be at least 30% less than the second throughflow cross section;
 operating the heat exchanger with seawater as a cooling medium;
 determining at least one of an exhaust gas temperature or an exhaust gas pressure difference of at least one of the particulate filter or the SCR catalytic converter; and
 if at least one of the exhaust gas temperature or exhaust gas pressure difference is greater than a limiting value, reducing a volume flow of exhaust gas by lowering the exhaust gas temperature using the heat exchanger.

4. The method according to claim 3, which further comprises, if at least one of the exhaust gas temperature or exhaust gas pressure difference is not greater than the limiting value, passing the cooling medium of the heat exchanger through a bypass of the heat exchanger.

5. A watercraft, comprising:
 an exhaust gas cleaning system including a particulate filter or an SCR catalytic converter and a heat exchanger disposed upstream of said particulate filter or SCR catalytic converter in an exhaust gas flow direction;
 said particulate filter or SCR catalytic converter having a maximum first throughflow cross section for the exhaust gas;
 said heat exchanger configured to operate with seawater as a cooling medium, said heat exchanger having an exhaust gas inlet side and an exhaust gas outlet side, and said exhaust gas inlet side of said heat exchanger having a second throughflow cross section for the exhaust gas;
 said heat exchanger configured to reduce a volume flow of exhaust gas between said exhaust gas inlet side and said exhaust gas outlet side by at least 30% in a temperature range of the exhaust gas of 300 to 550° C. at said exhaust gas inlet side, said reduction in volume flow being achieved by cooling the exhaust gas;
 said first throughflow cross section being at least 30% less than said second throughflow cross section; and
 a controller configured to:
 determine at least one of an exhaust gas temperature or an exhaust gas pressure difference of at least one of said particulate filter or said SCR catalytic converter, and
 if at least one of the exhaust gas temperature or exhaust gas pressure difference is greater than a limiting value, reduce a volume flow of exhaust gas by lowering the exhaust gas temperature using said heat exchanger.

6. The exhaust gas cleaning device according to claim 1, wherein said heat exchanger is disposed directly upstream of said particulate filter or SCR catalytic converter in the exhaust gas flow direction.

7. The method according to claim 3, wherein the heat exchanger is disposed directly upstream of the particulate filter or SCR catalytic converter in the exhaust gas flow direction.

8. The watercraft according to claim 5, wherein said heat exchanger is disposed directly upstream of said particulate filter or SCR catalytic converter in the exhaust gas flow direction.

* * * * *